United States Patent
Takai

(10) Patent No.: US 9,641,003 B2
(45) Date of Patent: May 2, 2017

(54) METHOD OF CONTROLLING SWITCH CIRCUIT, STORAGE STATUS ADJUSTING CIRCUIT, AND STORAGE BATTERY PACK

(71) Applicant: Masami Takai, Tokyo (JP)

(72) Inventor: Masami Takai, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 139 days.

(21) Appl. No.: 14/637,529

(22) Filed: Mar. 4, 2015

(65) Prior Publication Data
US 2015/0256000 A1  Sep. 10, 2015

(30) Foreign Application Priority Data
Mar. 4, 2014 (JP) ................................ 2014-041559

(51) Int. Cl.
| | | |
|---|---|---|
| H01M 10/44 | (2006.01) | |
| H01M 10/46 | (2006.01) | |
| H02J 7/00 | (2006.01) | |
| H01M 10/42 | (2006.01) | |

(52) U.S. Cl.
CPC ....... H02J 7/0013 (2013.01); H01M 10/4207 (2013.01); H02J 7/0016 (2013.01); H02J 7/0072 (2013.01); H02J 7/0034 (2013.01)

(58) Field of Classification Search
CPC ...... H02J 7/0008; H02J 7/0009; H02J 7/1423; H02J 7/0013; H02J 7/0016; H02J 7/0019
USPC ........... 320/103, 107, 12, 116, 118, 119, 122
See application file for complete search history.

(56) References Cited

U.S. PATENT DOCUMENTS

| | | | |
|---|---|---|---|
| 5,669,470 A | * | 9/1997 | Ross ...................... B60L 5/005 191/10 |
| 6,373,223 B1 | | 4/2002 | Anzawa et al. |
| 8,164,305 B2 | | 4/2012 | Zhang et al. |
| 2011/0076525 A1 | | 3/2011 | Zhang et al. |
| 2011/0316344 A1 | | 12/2011 | Van Lammeren |
| 2013/0002203 A1 | | 1/2013 | Kuraishi |

(Continued)

FOREIGN PATENT DOCUMENTS

| | | |
|---|---|---|
| EP | 2400622 A1 | 12/2011 |
| EP | 2549619 A1 | 1/2013 |

(Continued)

OTHER PUBLICATIONS

European search report dated Aug. 11, 2015 in corresponding European Patent Application No. 15157431.6.

(Continued)

*Primary Examiner* — Edward Tso
(74) *Attorney, Agent, or Firm* — Cooper & Dunham LLP

(57) ABSTRACT

A method of controlling a switch circuit which includes n (n is a natural number greater than or equal to 3) switching units configured to respectively connect n storage batteries, which are connected in series, with n coils, wherein the n storage batteries have respective potential differences between opposite ends thereof, the method includes the step of: controlling the switching units corresponding to k (k is a natural number wherein 1<k<n) storage batteries, which are secondary batteries other than a secondary battery having the largest potential difference among the potential differences of the n storage batteries, to connect the k storage batteries with respective k coils.

6 Claims, 5 Drawing Sheets

(56) References Cited

U.S. PATENT DOCUMENTS

| | | | |
|---|---|---|---|
| 2013/0021000 A1 | 1/2013 | Kuraishi | |
| 2013/0200849 A1* | 8/2013 | Crebier | H01M 10/441 320/116 |
| 2015/0256020 A1* | 9/2015 | Takai | H02J 7/0018 320/134 |
| 2015/0263545 A1* | 9/2015 | Takai | H02J 7/0013 320/162 |

FOREIGN PATENT DOCUMENTS

| | | |
|---|---|---|
| JP | 2002-223528 | 8/2002 |
| JP | 2011-083182 | 4/2011 |
| JP | 2013-013268 | 1/2013 |
| WO | WO 2013/065364 A1 | 5/2013 |

OTHER PUBLICATIONS

Matthias Kauer et al., "Modular System-Level Architecture for Concurent Cell Balancing", 2013, pp. 1-10.
Jian Cao et al., Battery Balancing Methods: A Comprehensive Review, Vehicle Power and Propulsion Conference, 2008, pp. 1-6.

\* cited by examiner

METHOD OF CONTROLLING SWITCH CIRCUIT, STORAGE STATUS ADJUSTING CIRCUIT, AND STORAGE BATTERY PACK

BACKGROUND OF THE INVENTION

1. Field of the Invention

The present technology relates to a method of controlling a switch circuit, a storage status adjusting circuit, and a storage battery pack with respect to a storage unit capable of charge and discharge.

2. Description of the Related Art

A storage battery pack, having a plurality of secondary batteries (cells) connected in series, which has an electronic circuit to average cell voltages of the cells, has been known. As for averaging cell voltages, an active method, in which electricity is transferred between the cells, is gathering attention.

An electronic circuit adopting the active method has a transformer and a switching element for activating the transformer, accumulates electricity in a primary coil during the time the switching element is turned on, and outputs electricity accumulated in the primary coil when the switching element is turned off. An averaging of cell voltages in secondary batteries is performed by repeating such an operation to provide a cell connected with a secondary coil with electricity, in an electronic circuit adopting the active method (for example, Japanese Laid-open Patent Publication No. 2002-223528, No. 2011-83182, No. 2013-13268).

However, in an electronic circuit adopting the active method, energy-loss by the transformer is large.

RELATED ART DOCUMENT

Patent Document

[Patent Document 1]: Japanese Laid-open Patent Publication No. 2002-223528
[Patent Document 2]: Japanese Laid-open Patent Publication No. 2011-83182
[Patent Document 3]: Japanese Laid-open Patent Publication No. 2013-13268

SUMMARY OF THE INVENTION

An object of disclosure of the present technology is to reduce energy-loss.

The following configuration is adopted to achieve the aforementioned object.

In one aspect of the embodiment, a method of controlling a switch circuit which includes n (n is a natural number greater than or equal to 3) switching units configured to respectively connect n storage batteries, which are connected in series, with n coils, wherein the n storage batteries have respective potential differences between opposite ends thereof, the method includes the step of: controlling the switching units corresponding to k (k is a natural number wherein 1<k<n) storage batteries, which are secondary batteries other than a secondary battery having the largest potential difference among the potential differences of the n storage batteries, to connect the k storage batteries with respective k coils.

Other objects, features and advantages of the present invention will become more apparent from the following detailed description when read in conjunction with the accompanying drawings.

DETAILED DESCRIPTION OF THE PREFERRED EMBODIMENTS

Figure 1:
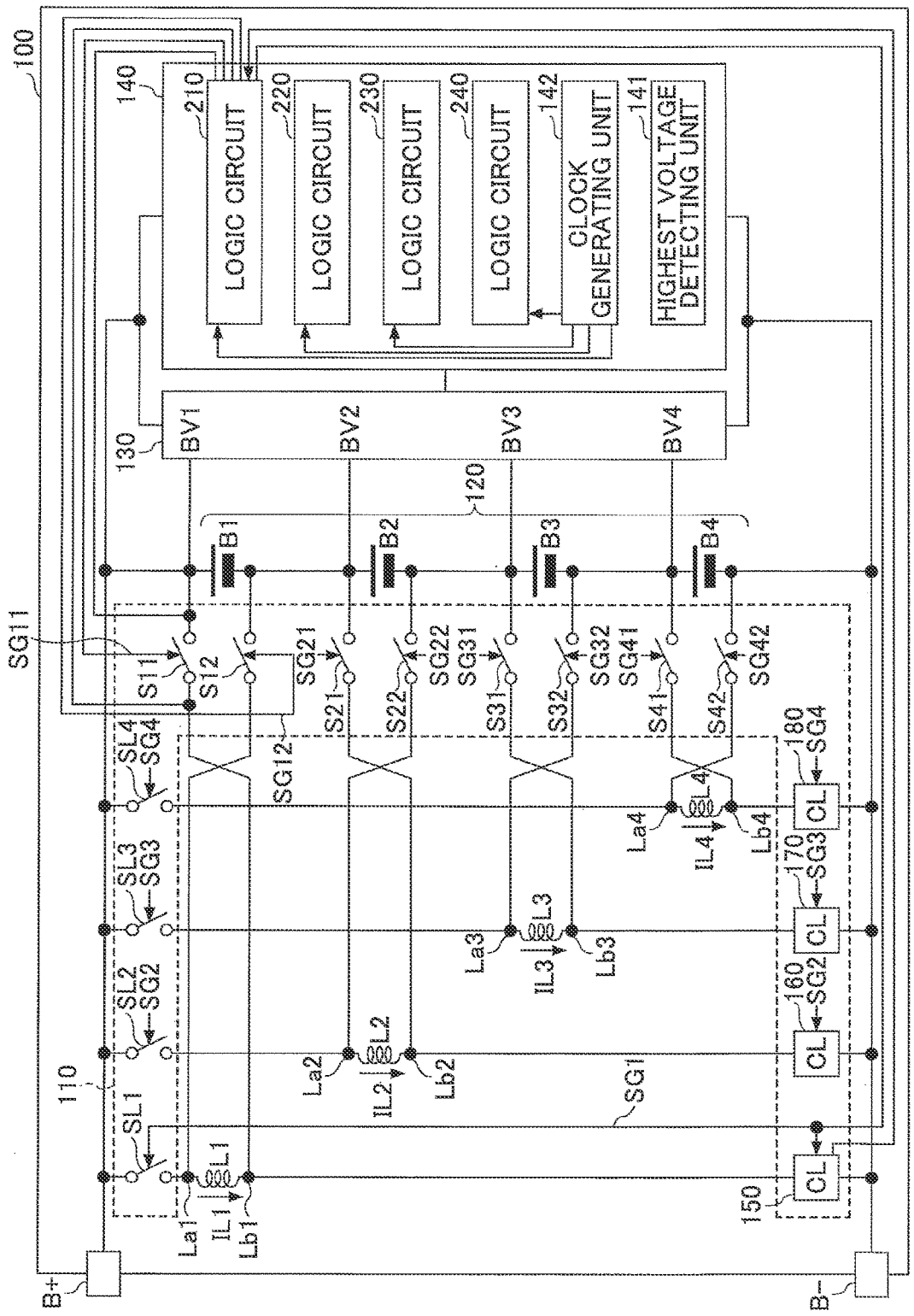
FIG. 1 is an illustration diagram of a storage battery pack.

Herein below, embodiments will be described with reference to the accompanying drawings. FIG. 1 is an illustration diagram of a storage battery pack.

A storage battery pack 100 of the present embodiment includes a B+ terminal, a B− terminal, a coil L1, a coil L2, a storage status adjusting circuit 110, an assembled battery 120, a cell voltage detecting circuit 130, and a controller 140.

The storage status adjusting circuit 110 of the present embodiment performs averaging of cell voltages in a plurality of secondary batteries included in the assembled battery 120, and adjusts a status of electric energy storage (i.e. storage status) in each of the secondary batteries.

The storage battery pack 100 of the present embodiment supplies electricity accumulated in the assembled battery 120 to a load connected through the B+ terminal and the B− terminal. Also, the storage battery pack 100 of the present embodiment charges the secondary batteries in the assembled battery 120 by a battery charger connected through the B+ terminal and the B− terminal.

The storage status adjusting circuit 110 of the present embodiment includes switching elements SL1, SL2, SL3, SL4, S11, S12, S21, S22, S31, S32, S41, and S42, and current limiting circuits 150, 160, 170 and 180. Each of the switching elements in the storage status adjusting circuit 110 of the present embodiment is, for example, a MOSFET (Metal-Oxide-Semiconductor Field-Effect Transistor), or the like.

The assembled battery 120 of the present embodiment includes a secondary battery B1, a secondary battery B2, a secondary battery B3, and a secondary battery B4. The secondary batteries B1-B4 are storage means capable of charge and discharge, and are connected in series between the B+ terminal and the B− terminal. Coils L1, L2, L3 and L4 of the present embodiment are respectively disposed corresponding to the secondary battery B1, the secondary battery B2, the secondary battery B3 and the secondary battery B4. Although the present embodiment is directed to a configuration in which the assembled battery 120 has the four secondary batteries B1-B4, this is not a limiting example. The secondary batteries may be configured with such as electric double-layer capacitors, or the like, in the present embodiment. Further, in the present embodiment, although the secondary batteries included in the assembled battery 120 are four, this is not a limiting example. The number of the secondary batteries included in the assembled battery 120 may be any number which is greater than or equal to two.

The cell voltage detecting circuit 130 in the present embodiment detects respective cell voltages in the secondary batteries B1-B4, and outputs the detected cell voltages to the controller 140.

The controller 140 of the present embodiment controls respective supply and respective shut-off of coil current IL1, IL2, IL3, and IL4 to the coils L1, L2, L3 and L4. Also, the controller 140 of the present embodiment detects a secondary battery having the highest voltage among the secondary batteries B1-B4, then, let coils, which correspond to the secondary batteries other than the detected secondary battery, respectively release electricity accumulated in the coils to the secondary batteries other than the detected secondary battery.

The storage status adjusting circuit 110 of the present embodiment, having the configuration described above, adjusts the storage statuses of the secondary batteries so that the cell voltages of the secondary batteries become to correspond with the highest cell voltage. Also, in the storage status adjusting circuit 110 of the present embodiment, electricity is supplied from one coil to one secondary battery so that the storage status of a secondary battery is adjusted using electricity accumulated in a coil corresponding to the secondary battery. Therefore, according to the storage status adjusting circuit 110 of the present embodiment, the storage status of the secondary batteries B1-B4 can be quickly averaged.

Herein below, connections between parts in the storage status adjusting circuit 110 of the present embodiment will be described.

The secondary batteries B1-B4 of the present embodiment are connected in series. A positive electrode of the secondary battery B1 is connected with the B+ terminal, and a negative electrode of the secondary battery B4 is connected with the B− terminal.

In the present embodiment, one end of the switching elements SL1, SL2, SL3 and SL4 are respectively connected with the positive electrode of the secondary battery B1.

The other end of the switching element SL1 is connected with one end of the coil L1. In FIG. 1, a connecting point between the coil L1 and the switching element SL1 is shown as a connecting point La1. The other end of the coil L1 is connected with one end of a current limiting circuit 150. In FIG. 1, a connecting point between the other end of coil L1 and one end of the current limiting circuit 150 is shown as a connecting point Lb1. The other end of the current limiting circuit 150 is connected with the B− terminal and the negative electrode of the secondary battery B4.

The other end of the switching element SL2 is connected with one end of the coil L2. In FIG. 1, a connecting point between the coil L2 and the switching element SL2 is shown as a connecting point La2. The other end of coil L2 is connected with one end of a current limiting circuit 160. In FIG. 1, a connecting point between the other end of the coil L2 and one end of the current limiting circuit 160 is shown as a connecting point Lb2. The other end of the current limiting circuit 160 is connected with the B− terminal and the negative electrode of the secondary battery B4.

The other end of the switching element SL3 is connected with one end of the coil L3. In FIG. 1, a connecting point between the coil L3 and the switching element SL3 is shown as a connecting point La3. The other end of coil L3 is connected with one end of a current limiting circuit 170. In FIG. 1, a connecting point between the other end of coil L3 and one end of the current limiting circuit 170 is shown as a connecting point Lb3. The other end of the current limiting circuit 170 is connected with the B− terminal and the negative electrode of the secondary battery B4.

The other end of the switching element SL4 is connected with one end of the coil L4. In FIG. 1, a connecting point between the coil L4 and the switching element SL4 is shown as a connecting point La4. The other end of coil L4 is connected with one end of a current limiting circuit 180. In FIG. 1, a connecting point between the other end of the coil L4 and one end of the current limiting circuit 180 is shown as a connecting point Lb4. The other end of the current limiting circuit 180 is connected with the B− terminal and the negative electrode of the secondary battery B4.

That is, in the present embodiment, the switching element SL1 serves as a switching unit that controls accumulation and release of electricity of the coil L1, the switching element SL2 serves as a switching unit that controls accumulation and release of electricity of the coil L2, the switching element SL3 serves as a switching unit that controls accumulation and release of electricity of the coil L3, and the switching element SL4 serves as a switching unit that controls accumulation and release of electricity of the coil L4. Additionally, a detailed description of the current limiting circuits 150, 160, 170 and 180 will be given later.

In the present embodiment, one end of the switching element S11 is connected with the positive electrode of the secondary battery B1. The other end of the switching element S11 is connected with the connecting point Lb1. Also, in the present embodiment, one end of the switching element S12 is connected with the negative electrode of the secondary battery B1 (a positive electrode of the secondary battery B2), and the other end of the switching element S12 is connected with the connecting point La1.

In the present embodiment, one end of the switching element S21 is connected with the positive electrode of the secondary battery B2. The other end of the switching element S21 is connected with the connecting point Lb2. Also, in the present embodiment, one end of the switching element S22 is connected with the negative electrode of the secondary battery B2 (a positive electrode of the secondary battery B3), and the other end of the switching element S22 is connected with the connecting point La2.

In the present embodiment, one end of the switching element S31 is connected with the positive electrode of the secondary battery B3. The other end of the switching element S31 is connected with the connecting point Lb3. Also, in the present embodiment, one end of the switching element S32 is connected with the negative electrode of the secondary battery B3 (a positive electrode of the secondary battery B4), and the other end of the switching element S32 is connected with the connecting point La3.

In the present embodiment, one end of the switching element S41 is connected with the positive electrode of the secondary battery B4. The other end of the switching element S41 is connected with the connecting point Lb4. Also, in the present embodiment, one end of the switching element S42 is connected with the negative electrode of the secondary battery B4, and the other end of the switching element S42 is connected with the connecting point La4.

Thus, in the present embodiment, the switching elements S11 and S12 are disposed corresponding to the secondary battery B1, and form a switching unit that controls connection/disconnection between the secondary battery B1 and the coil L1. Also, the switching elements S21 and S22 are disposed corresponding to the secondary battery B2, and form a switching unit that controls connection/disconnection between the secondary battery B2 and the coil L2.

The switching elements S31 and S32 are disposed corresponding to the secondary battery B3, and form a switching unit that controls connection/disconnection between the secondary battery B3 and the coil L3. The switching elements S41 and S42 are disposed corresponding to the secondary battery B4, and form a switching unit that controls connection/disconnection between the secondary battery B4 and the coil L4.

The cell voltage detecting circuit 130 and the controller 140 are connected between the B+ terminal and the B− terminal.

The controller 140 of the present embodiment includes logic circuits 210, 220, 230 and 240. Also, the controller 140 of the present embodiment includes a highest voltage detecting unit 141 and a clock generating unit 142.

The logic circuit 210 of the present embodiment, corresponding to the secondary battery B1, controls supply of electricity from the coil L1 and shut-off therefrom. The logic circuits 220 of the present embodiment, corresponding to the secondary battery B2, controls supply of electricity from the coil L2 and shut-off therefrom. The logic circuits 230 of the present embodiment, corresponding to the secondary battery B3, controls supply of electricity from the coil L3 and shut-off therefrom. The logic circuits 240 of the present embodiment, corresponding to the secondary battery B4, controls supply of electricity from the coil L4 and shut-off therefrom.

The highest voltage detecting unit 141 of the present embodiment detects a secondary battery having the highest cell voltage among the secondary batteries B1-B4, based on the output from the cell voltage detecting circuit 130, and informs the logic circuits of the detection result.

Specifically, the highest voltage detecting unit 141 has provided the logic circuits 210 and 220 with a select notification signal with a low level (hereinafter referred to as L level), in advance. When the highest voltage detecting unit 141 detects the secondary battery having the highest cell voltage, the highest voltage detecting unit 141 may invert levels of the select notification signals, which are provided to the logic circuits corresponding to secondary batteries other than the detected secondary battery, to a high level (hereinafter referred to as H level).

The clock generating unit 142 of the present embodiment generates a clock signal to be provided to the logic circuits 210, 220, 230 and 240. The clock generating unit 142 of the present embodiment provides the clock signals of a certain frequency to the logic circuits that correspond to the secondary batteries other than the secondary battery detected by the highest voltage detecting unit 141, and the level of the clock signal may be fixed when the clock signal is provided to the logic circuit that corresponds to the secondary battery having the highest cell voltage.

The logic circuit 210 generates a control signal SG1 for controlling the switching element SL1 and a switching element SCL1 included in the current limiting circuit 150, a control signal SG11 for controlling the switching element S11, and a control signal SG12 for controlling the switching element S12.

The logic circuit 220 generates a control signal SG2 for controlling the switching element SL2 and a switching element SCL2 included in the current limiting circuit 160, a control signal SG21 for controlling the switching element S21, and a control signal SG22 for controlling the switching element S22.

The logic circuit 230 generates a control signal SG3 for controlling the switching element SL3 and a switching element SCL3 included in the current limiting circuit 170, a control signal SG31 for controlling the switching element S31, and a control signal SG32 for controlling the switching element S32.

The logic circuit 240 generates a control signal SG4 for controlling the switching element SL4 and a switching element SCL4 included in the current limiting circuit 180, a control signal SG41 for controlling the switching element S41, and a control signal SG42 for controlling the switching element S42.

Additionally, in FIG. 1, only connections between the logic circuit 210 and the switching element SL1, and between the logic circuit 210 and the switching elements S11 and S12 are shown. In the storage battery pack 100 of the present embodiment, connections between the logic circuit 220 and the switching element SL2, and between the logic circuit 220 and the switching elements S21 and S22, connections between the logic circuit 230 and the switching element SL3, and between the logic circuit 230 and the switching elements S31 and S32, and connections between the logic circuit 240 and the switching element SL4, and between the logic circuit 240 and the switching elements S41 and S42 are the same as the connections between the logic circuit 210 and the switching element SL1, and between the logic circuit 210 and the switching elements S11 and S12. A detailed description of the logic circuits 210, 220, 230, and 240 will be given later.

As described above, in the present embodiment, the controller 140 detects a secondary battery having the highest cell voltage, and, in the storage status adjusting circuit 110, the secondary batteries other than the detected secondary battery are connected with respective coils corresponding to the secondary batteries other than the detected secondary. In the storage status adjusting circuit 110 of the present embodiment, through such operation, electricity accumulated in the coils are respectively supplied to secondary batteries other than the secondary battery having the highest cell voltage; then, storage statuses of secondary batteries are adjusted.

In the following, the current limiting circuits 150, 160, 170 and 180 and the logic circuits 210, 220, 230 and 240 are described with reference to FIG. 2.

Figure 2:
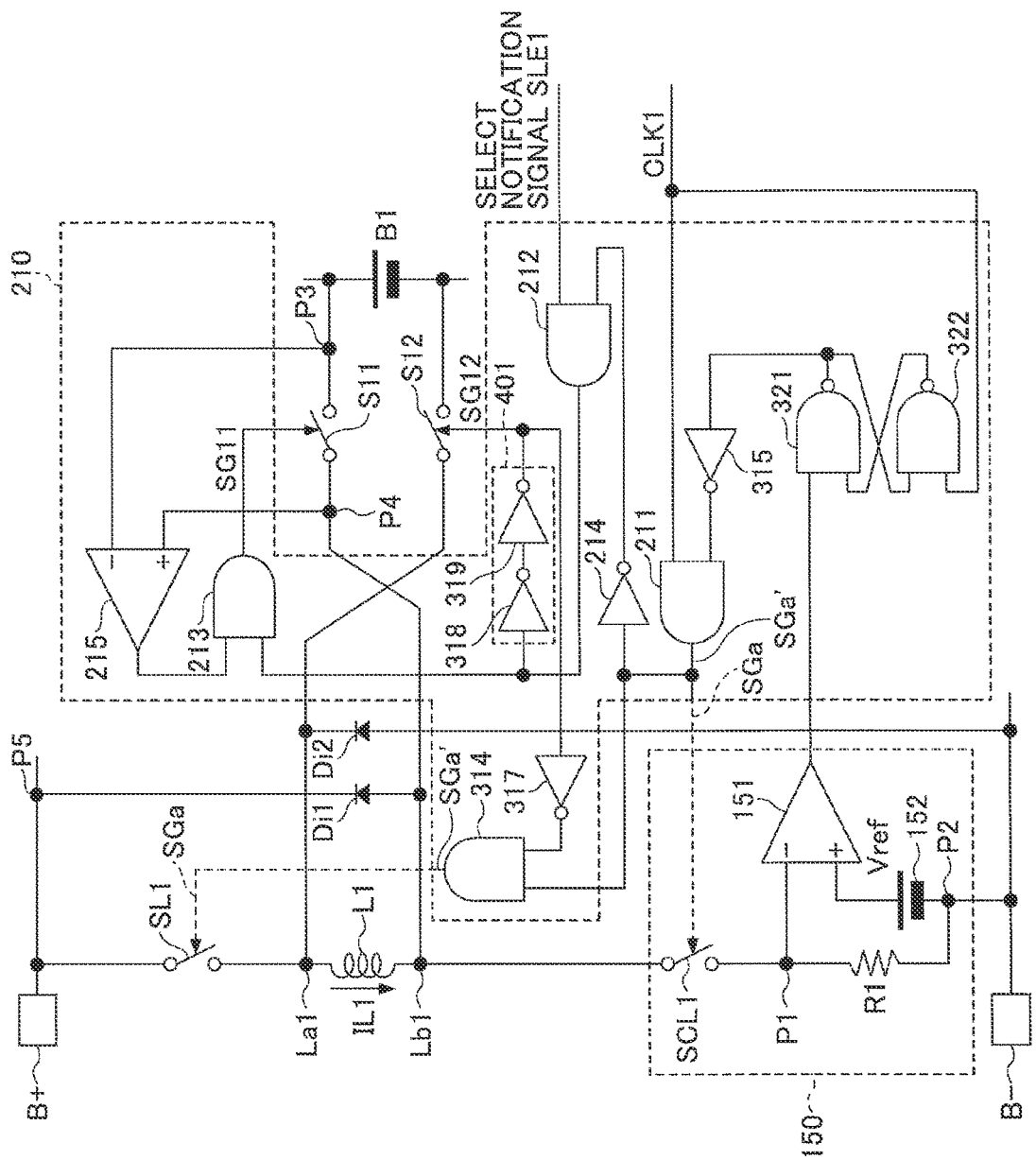
FIG. 2 is an illustrative drawing for illustrating an example of a current limiting circuit and a logic circuit.

FIG. 2 is an illustrative drawing for illustrating an example of a current limiting circuit and a logic circuit. The current limiting circuits 150, 160, 170 and 180 of the present embodiment respectively have identical configurations. Also, the logic circuits 210, 220, 230, and 240 of the present embodiment respectively have identical configurations. Therefore, in FIG. 2, the logic circuit 210 and the current limiting circuit 150 are shown as an example. Additionally, the logic circuit 210 in FIG. 2 is an example of a circuit for performing an operation shown in a timing diagram in FIG. 3. The logic circuit 210 may only have a configuration for performing the operation shown in the timing diagram in FIG. 3.

The current limiting circuit 150 includes a switching element SCL1, a resistor R1, a comparator 151 and a reference voltage generating unit 152.

One end of the switching element SCL1 is connected with the connecting point Lb1 and the other end of the switching element SCL1 is connected with the connecting point P1 at which an inverting input terminal of the comparator 151 and one end of the resistor R1 are connected. The switching elements SL1 and SCL1 of the present embodiment are controlled to be switched on-off by the control signals SGa (in FIG. 1, shown as SG1), respectively output from the logic circuit 210. That is, the switching elements SL1 and SCL1 of the present embodiment form a switching unit that controls connection/disconnection in series between the secondary batteries B1-B4 and the coil L1. In other words, the switching elements SL1 and SCL1 of the present embodiment form a switching unit that controls accumulation and release of electricity of the coil L1. The other end of the resistor R1 is connected with a connecting point P2 at which a negative electrode of the reference voltage generating unit 152 and the B− terminal are connected.

The reference voltage generating unit 152 generates a reference voltage Vref, and a positive electrode thereof is connected with the non-inverting input terminal of the comparator 151. An output signal of the comparator 151 is provided at one input terminal of a NAND circuit 321 described below.

The logic circuit 210 of the present embodiment includes AND circuits 211, 212, 213 and 314, NOT circuits 315, 214, 317, 318 and 319, a comparator 215, and NAND circuits 321 and 322.

The clock signal CLK1 output from the clock generating unit 142 is provided at one input terminal of the AND circuit 211 and an output signal of the NOT circuit 315 is provided at the other input terminal of the AND circuit 211. An output signal of the AND circuit 211 is provided to the NOT circuit 214. Also, the output signal of the AND circuit 211 is provided at one input terminal of the AND circuit 314.

Further, the output signal of the AND circuit 211 is provided, as the signal SGa', to the OR circuit (not shown) in the controller 140. An output signal of the OR circuit is provided, as the control signal SGa, to the switching element SCL1.

An output signal of the NOT circuit 214 is provided at one input terminal of the AND circuit 212. The select notification signal SLE1, output from the highest voltage detecting unit 141, is provided at the other input terminal of the AND circuit 212.

An output signal of the AND circuit 212 is provided at an input terminal of the NOT circuit 318. An output signal of the NOT circuit 318 is provided at an input terminal of the NOT circuit 319. An output signal of the NOT circuit 319, as a control signal SG12 for controlling on-off of the switching element S12, is provided to the switching element S12. Also, the output signal of the NOT circuit 319 is provided at an input terminal of the NOT circuit 317. Additionally, in the present embodiment, the NOT circuit 318 and the NOT circuit 319 form a delay circuit 401.

The output signal of the AND circuit 212 is also provided at one input terminal of the AND circuit 213. An output signal of the comparator 215 is provided at the other input terminal of the AND circuit 213.

An output signal of the AND circuit 213 is provided, as a control signal SG11 for controlling on-off of the switching element S11, to the switching element S11.

An inverting input terminal of the comparator 215 is connected with one end of the switching element S11 being connected with the secondary battery B1. A connecting point between the inverting input terminal of the comparator 215 and one end of the switching element S11 is shown as a connecting point P3.

A non-inverting input terminal of the comparator 215 is connected with the other end of the switching element S11 being connected with the coil L1. A connecting point between the non-inverting terminal of the comparator 215 and the other end of the switching element S11 is shown as a connecting point P4.

In the present embodiment, the signal SGa', which is an output signal of the AND circuit 211, is provided at one input terminal of the AND circuit 314. An output signal of the NOT circuit 317 is provided at the other input terminal of the AND circuit 314. An output signal of the AND circuit 314 is provided, as the signal SGa', to the OR circuit (not shown) in the controller 140. An output signal of the OR circuit is provided, as the control signal SGa, to the switching element SL1.

In the present embodiment, the NAND circuit 321 and the NAND circuit 322 form a flip-flop. An output signal of the comparator 151 is provided at one input terminal of the NAND circuit 321 while an output signal of the NAND circuit 322 is provided at the other input terminal of the NAND circuit 321. The clock signal CLK1 output from the clock generating unit 142 is provided at one input terminal of the NAND circuit 322 while an output signal of the NAND circuit 321 is provided at the other input terminal of the NAND circuit 322. The output signal of the NAND circuit 321 is provided at an input terminal of the NOT circuit 315.

Also, in the present embodiment, one end of the switching element S11 is connected with an anode electrode of a diode Di1. A cathode electrode of the diode Di1 is connected with the positive electrode of the secondary battery B1 and the B+ terminal. A connecting point between the cathode electrode of the diode Di1 and the B+ terminal is shown as a connecting point P5. Further, one end of the switching element S12 is connected with a cathode electrode of a diode Di2. The anode electrode of the diode Di2 is connected with the negative electrode of the secondary battery B4 and the B− terminal.

Figure 3:
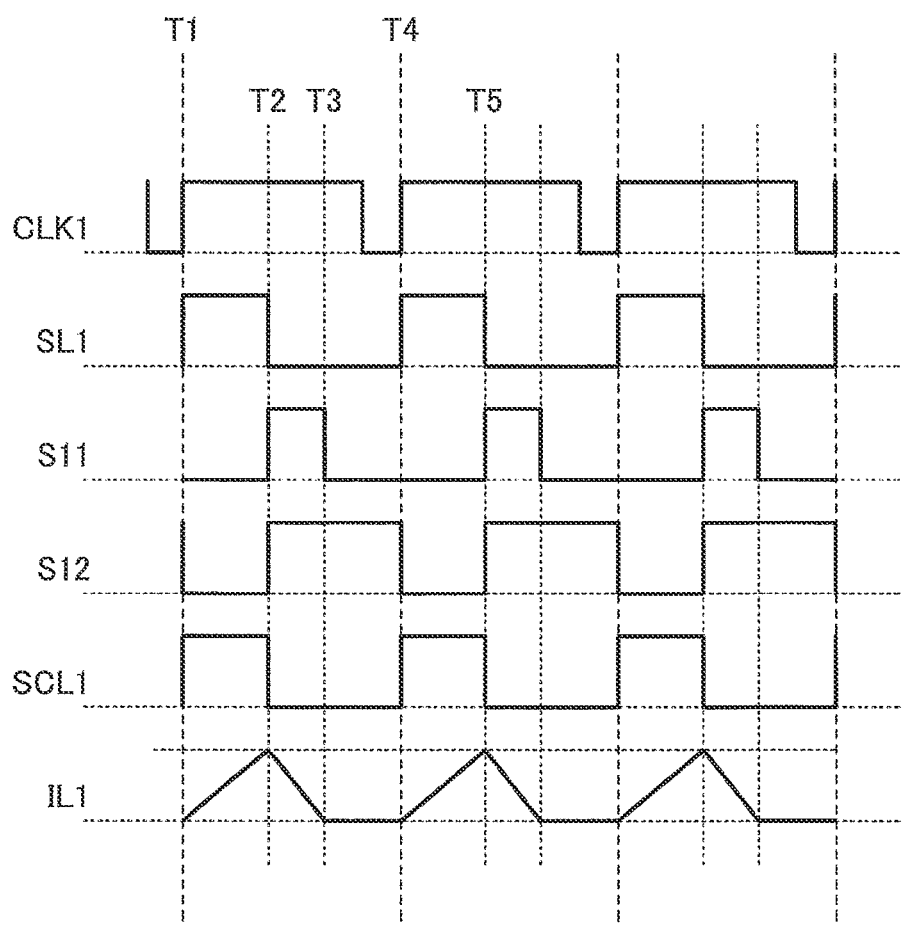
FIG. 3 is a timing diagram for illustrating an operation of a storage status adjusting circuit.

Herein below, an operation of the storage status adjusting circuit 110 of the present embodiment will be described with reference to FIG. 3. FIG. 3 is a timing diagram for illustrating an operation of a storage status adjusting circuit. In FIG. 3, an operation of the storage status adjusting circuit 110, in a case where the secondary battery B4 has been detected by the highest voltage detecting unit 141, and a H level select notification signal SLE1 has been provided to the logic circuit 210, which corresponds to secondary battery B1 that is a secondary battery other than the secondary battery B4. More specifically, in FIG. 3, an operation of the switching elements S11 and S12 that form a switching unit for controlling connection/disconnection between secondary batteries B1 and coil L1, and an operation of the switching elements SL1 and SCL1 that form a switching unit for controlling accumulation and release of electricity of the coil L1.

Additionally, in a case where the secondary battery B4 is detected by the highest voltage detecting unit 141, H level select notification signals SLE2 and SLE3 and clock signals CLK2 and CLK3 of a certain frequency are also provided to the logic circuits 220 and 230 that are respectively correspond to the secondary battery B2 and B3.

Therefore, the switching elements S21 and S22 that form a switching unit for controlling connection/disconnection between secondary batteries B2 and coil L2, and the switching elements SL2 and SCL2 (not shown) that form a switching unit for controlling accumulation and release of electricity of the coil L2 are similarly operated to the operation shown in FIG. 3. Also, the switching elements S31 and S32 that form a switching unit for controlling connection/disconnection between secondary batteries B3 and coil L3, and the switching elements SL3 and SCL3 (not shown) that form a switching unit for controlling accumulation and release of electricity of the coil L3 are similarly operated to the operation shown in FIG. 3.

First, an operation of the switching elements SL1, SCL1, S11 and S12 at timing T1 will be described. At timing T1, a H level clock signal CLK1 is provided. Signal level of an output signal of the comparator 151 is H level, since a voltage between connecting points P1 and P2 does not reach the reference voltage Vref, at timing T1. Therefore, the signal level of an output signal of the AND circuit 211 becomes H level. That is, at timing T1, the signal level of the control signal SG1 becomes H level, then switching elements SL1 and SCL1 are switched on to start to supply coil current IL1 to the coil L1.

Also, through the NOT circuit 214, the output signal of the AND circuit 211 is inverted to L level to be provided at one input terminal of the AND circuit 212. The signal level of an output signal of the AND circuit 212 is L level, since a H level select notification signal SLE1 is provided at the other input terminal of the AND circuit 212. That is, at timing T1, the signal level of the control signal SG12 becomes L level, then the switching element S12 is switched off.

A L level output signal of the AND circuit 212 is provided at one input terminal of the AND circuit 213. Therefore, the signal level of an output signal of the AND circuit 213 is L level regardless of the signal level of an output signal of the comparator 215. That is, at timing T1, the signal level of control signal SG11 becomes L level, then switching element S11 is switched off.

As described above, in the storage status adjusting circuit 110 of the present embodiment, at timing T1, switching elements SL1 and SCL1 are switched on, while switching elements S11 and S12 are switched off.

Thus, in the present embodiment, at timing t1, the coil L1 is connected in series with the secondary batteries B1-B4 when, for example, the storage battery pack 100 is not connected with a battery charger. In this case, the coil current IL1 is supplied from the assembled battery 120 to the coil L1.

Meanwhile, at timing t1, through the B+ terminal and the B− terminal, the coil L1 is connected with a battery charger when, for example, the storage battery pack 100 is connected with the battery charger. In this case, the coil current IL1 is supplied from the battery charger to the coil L1.

In the following, an operation of the switching elements SL1, SCL1, S11 and S12 at timing T2 will be described. At timing T2, the coil current IL1 is supplied to the coil L1, wherein the voltage between the connecting points P1 and P2 reaches the reference voltage Vref. At timing T2, an output signal of the comparator 151 is inverted from H level to L level. Therefore, at timing T2, an output signal of the AND circuit 211 is inverted to L level regardless of the signal level of the clock signal CLK1.

That is, at timing T2, the signal level of control signal SG1 becomes L level, then switching elements SL1 and SCL are switched off to stop supplying the coil current IL1 to the coil L1.

Also, through the NOT circuit 214, the output signal of the AND circuit 211 is inverted to H level to be provided at one input terminal of the AND circuit 212. Signal level of an output signal of the AND circuit 212 becomes H level, since a H level select notification signal SLE1 is provided at the other input terminal of the AND circuit 212. That is, at timing T2, the signal level of the control signal SG12 becomes H level, then the switching element S12 is switched on.

A H level output signal of the AND circuit 212 is provided at one input terminal of the AND circuit 213. In this case, an electric potential at the connecting point P4 is higher than an electric potential at the connecting point P3, since electricity is accumulated in the coil L1. Therefore, the signal level of an output signal of the comparator 215 becomes H level. Thus, an output signal of the AND circuit 213 is inverted from L level to H level.

That is, at timing T2, the signal level of a control signal SG11 becomes H level, and the switching element S11 is switched on.

As described above, in the storage status adjusting circuit 110 of the present embodiment, at timing T2, the switching elements SL1 and SCL1 are switched off, while the switching elements S11 and S12 are switched on. Through this operation, in the storage status adjusting circuit 110 of the present embodiment, the secondary battery B1, which is a secondary battery other than the secondary battery B4 having been detected by the highest voltage detecting unit 141, is connected with the coil L1 to release electricity accumulated in the coil L1 to the secondary battery B1.

In the following, an operation of the switching elements SL1, SCL1, S11 and S12 at timing T3 will be described. At timing T3, release of electricity from the coil L1 to the secondary battery B1 is finished. In the present embodiment, the timing at which the release of electricity from the coil L1 is finished is detected based on a potential difference between the connecting point P3 and the connecting point P4. More specifically, in the present embodiment, an electric potential at connecting point P3 is compared with an electric potential at connecting point P4 by the comparator 215. Then, the storage adjusting circuit 110 switches off the switching element S11 by an output signal of the comparator 215, when the electric potential at connecting point P3 is equal to the electric potential at connecting point P4, thereby disconnecting the coil L1 from the secondary battery B1. In the present embodiment, through such control of the switching element S11, energy back flow from secondary battery B1 to the coil L1 is prevented.

At timing T3, when the electric potential at connecting point P3 is equal to the electric potential at connecting point P4 through release of electricity from the coil L1 to the secondary battery B1, an output signal of the comparator 215 is inverted from H level to L level. Therefore, an output signal of the AND circuit 213 is inverted from H level to L level. That is, at timing T3, the signal level of the control signal SG11 becomes L level, and the switching element S11 is switched off to disconnect the coil L1 from the secondary battery B1.

As described above, in the storage adjusting circuit 110 of the present embodiment, in a term between timing T2 and timing T3, electricity accumulated in the coil L1 is supplied to the secondary battery B1 to charge the secondary battery B1.

Also, in the storage adjusting circuit 110 of the present embodiment, in a term between timing T2 and T3, similarly to the operation of the coil L1 and the secondary battery B1, electricity accumulated in the coil L2 and L3 is respectively supplied to the secondary batteries B2 and B3 to charge the secondary batteries B2 and B3.

Additionally, for example, in the storage adjusting circuit 110 of the present embodiment, in a term between timing T2 and T3, only one or two secondary batteries among the secondary batteries B1-B3 may be charged. That is, at least one of storage batteries, which are secondary batteries other than a secondary battery having a largest potential difference among the potential differences of the n storage batteries, may be connected with a respective coil.

Additionally, in the present embodiment, at timing T3, the switching elements SL1 and SCL1 remain switched off while the switching element S12 remains switched on. In the present embodiment, the timing at which the control signal SG1 is inverted to H level (the timing at which the switching elements SL1 and SCL1 are switched on) is determined based on the clock signal CLK1.

Further, in the present embodiment, the control signal SG1 is a signal in reverse phase to the control signal SG12. Therefore, the control signal SG12 is inverted from H level to L level in synchronization with the timing at which the control signal SG1 is inverted from L level to H level. That is, the switching element S12 is switched off in synchronization with the timing at which the switching elements SL1 and SCL1 are switched on.

At timing T4, when the signal level of the clock signal CLK1 becomes H level, similarly to the case of timing T1, the switching elements SL1 and SCL1 are switched on while the switching element S12 is switched off. Additionally, at this timing, from timing T3, the switching element S11 remains switched off.

That is, at timing T4, an operation of the storage status adjusting circuit 110 of the present embodiment is similar to that at timing T1, coil current IL1 starts to be supplied to coil L1.

The highest voltage detecting unit 141 of the present embodiment may detect a secondary battery having the highest cell voltage during a term between timing T3 and timing T4 at which the clock signal CLK1 next rises. Also, the highest voltage detecting unit 141 may detect a secondary battery having the highest cell voltage during a term between timing T3 and timing T5 at which supply of coil current IL1 to coil L1 is stopped. The highest voltage detecting unit 141 of the present embodiment, for example, may detect a secondary battery having the highest cell voltage in every certain interval.

Herein below, an operation of the logic circuit 210, in a case where the secondary battery B1 is detected by the highest voltage detecting unit 141, will be described.

The highest voltage detecting unit 141 of the present embodiment provides L level select notification signal SLE1 to the logic circuit 210 which corresponds to the detected secondary battery B1.

Further, the clock generating unit 142 of the present embodiment provides the clock signal CLK being fixed at a signal level thereof to L level to the logic circuit 210 which corresponds to the secondary battery B1 detected by the highest voltage detecting unit 141.

Therefore, in a case where the highest voltage detecting unit 141 detects the secondary battery B1, the clock signal CLK, which is provided at one input terminal of the AND circuit 211, is fixed to L level, then, an output signal of the AND circuit 211 is also fixed to L level. Thus, the control signal SG1 is also fixed to L level to switch off the switching elements SL1 and SCL1.

Further, in the AND circuit 212, the select notification signal SLE1, which is provided at one input terminal of the AND circuit 212, is fixed to L level, then, an output signal of the AND circuit 212 is also fixed to L level. Thus, an output signal of the AND circuit 213 is fixed to L level, the control signals SG11 and SG12 become L level, and the switching elements S11 and S12 are switched off.

As described above, in the storage status adjusting circuit 110 of the present embodiment, switching elements SL1 and SCL1 are switched on in synchronization with a rising edge of the clock signal CLK1, and the coil L1 is connected between the B+ terminal and the B− terminal to accumulate electricity in the coil L1. Also, in the storage status adjusting circuit 110 of the present embodiment, switching elements S11 and S12 are operated so as to connect the coil L1 with the secondary battery B1 when electricity accumulated in the coil L1 reaches a certain value.

That is, in the present embodiment closed loops are formed, by connecting secondary batteries other than the secondary battery having the highest cell voltage with the coils respectively corresponding to the secondary batteries, wherein the secondary battery having the highest cell voltage is detected in every certain interval. Then, in each of the closed loops, electricity accumulated in the coil is supplied to the secondary battery to charge the secondary battery.

The storage status adjusting circuit 110 of the present embodiment can adjust the storage status through the operation described above to charge secondary batteries other than the secondary battery having the highest cell voltage among the plurality of the secondary batteries. Further, in the storage status adjusting circuit 110 in the present embodiment, the coils corresponding to respective secondary batteries are disposed on a one to one basis. Therefore, the storage adjusting circuit 110 of the present embodiment can charge the secondary batteries other than the secondary battery having the highest voltage by the coils respectively corresponding to the secondary batteries, and quickly make the cell voltages of the secondary batteries close to the highest cell voltage.

Further, the storage status adjusting circuit 110 can adjust the storage status of the secondary battery using one coil. Thus, the present embodiment can greatly contribute to downsizing compared to a transformer-type, and this advantageous effect becomes more remarkable, especially, in a case where larger current has to be controlled. Also, it is known that energy-loss is caused by a transformer not only with load but also without load; then, the present embodiment can eliminate energy-loss caused by transformers.

In the present embodiment, the reference voltages Vref generated by the reference voltage generating units of respective current limiting circuits can be changed. In the present embodiment, for example, the reference voltages Vref generated by the reference voltage generating units may be respectively changed according to cell voltages of corresponding secondary batteries other than the secondary battery having the highest cell voltage. In the present embodiment, cell voltages of the secondary batteries can be also averaged among the secondary batteries other than the secondary battery having the highest cell voltage, by changing the reference voltages so as to change energy accumulated in respective coils. Therefore, according to the present embodiment, quick averaging of the cell voltages of secondary batteries B1-B4 can be achieved.

Second Embodiment

Herein below, a second embodiment will be described with reference to the drawings. In the second embodiment, a diode is used to prevent energy back flow from secondary batteries B1-B4 to coils L1-L4, which is different from the case of the first embodiment. Therefore, in the description of the second embodiment below, only the difference between the second embodiment and the first embodiment will be described; an identical reference numeral will be applied to elements or the like that have similar functions and configurations to those of in the first embodiment, and descriptions thereof will be omitted.

Figure 4:
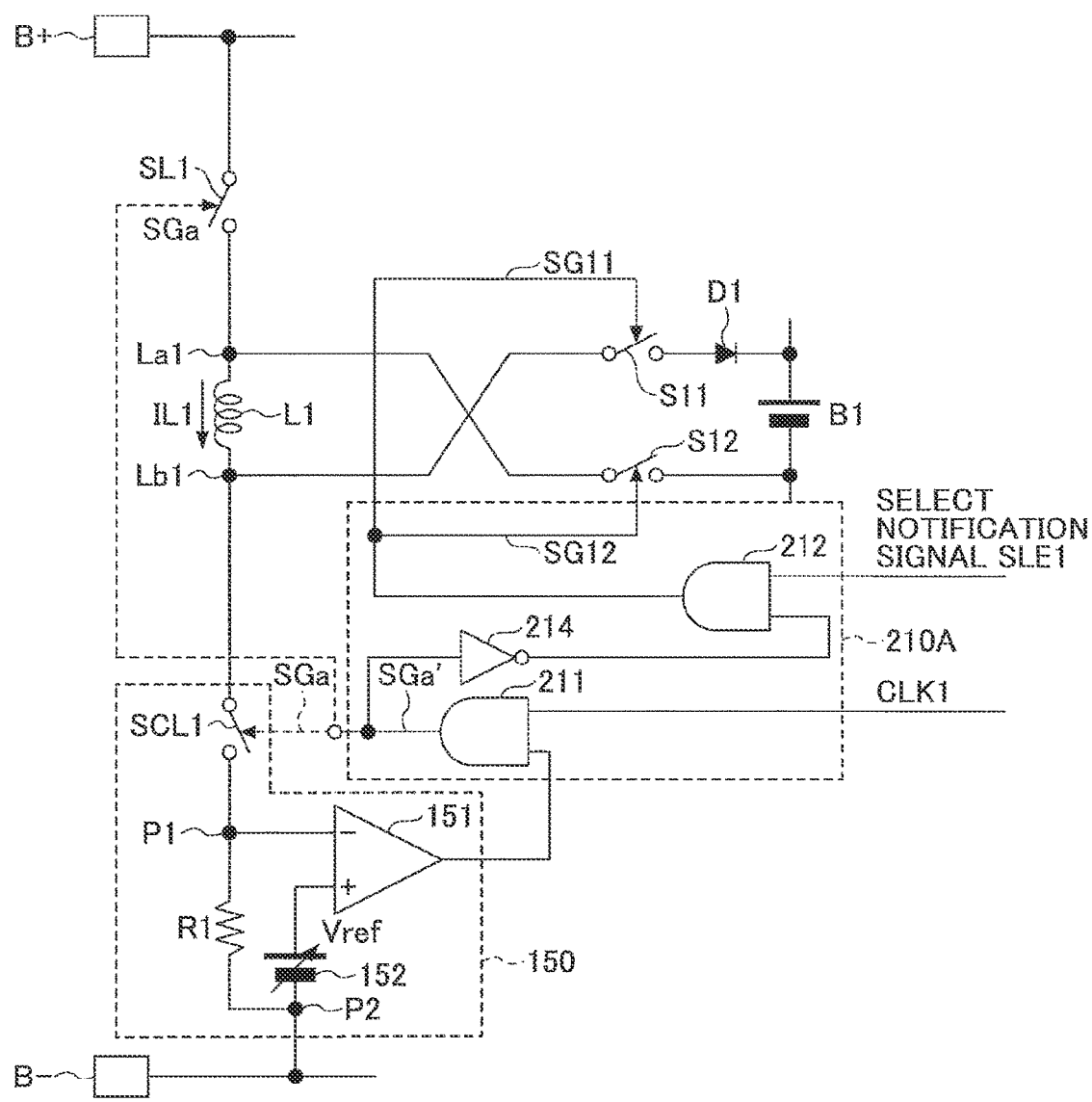
FIG. 4 is an illustrative drawing for illustrating another example of a current limiting circuit and a logic circuit.

FIG. 4 is an illustrative drawing for illustrating another example of a current limiting circuit and a logic circuit.

Additionally, in the present embodiment, logic circuits included in the controller 140 have similar functions; therefore, in FIG. 4, a logic circuit 210A is illustrated as an example of four logic circuits.

In the present embodiment, a diode D1 is disposed between one end of a switching element S11 and a positive electrode of a secondary battery B1. Additionally, in the storage status adjusting circuit of the present embodiment, a diode is respectively disposed, similarly to a configuration shown in FIG. 4, between one end of a switching element S21 and a positive electrode of a secondary battery B2, between one end of a switching element S31 and a positive electrode of a secondary battery B3, and between one end of a switching element S41 and a positive electrode of a secondary battery B4.

The logic circuit 210A of the present embodiment includes AND circuits 211 and 212, and a NOT circuit 214. In the present embodiment, an output signal of the AND circuit 212 is respectively provided, as control signals SG11 and SG12, to the switching element S11 and a switching element S12.

Therefore, in the present embodiment, control signals SG11 and SG12 are signals in reverse phase to a control signal SGa.

Figure 5:
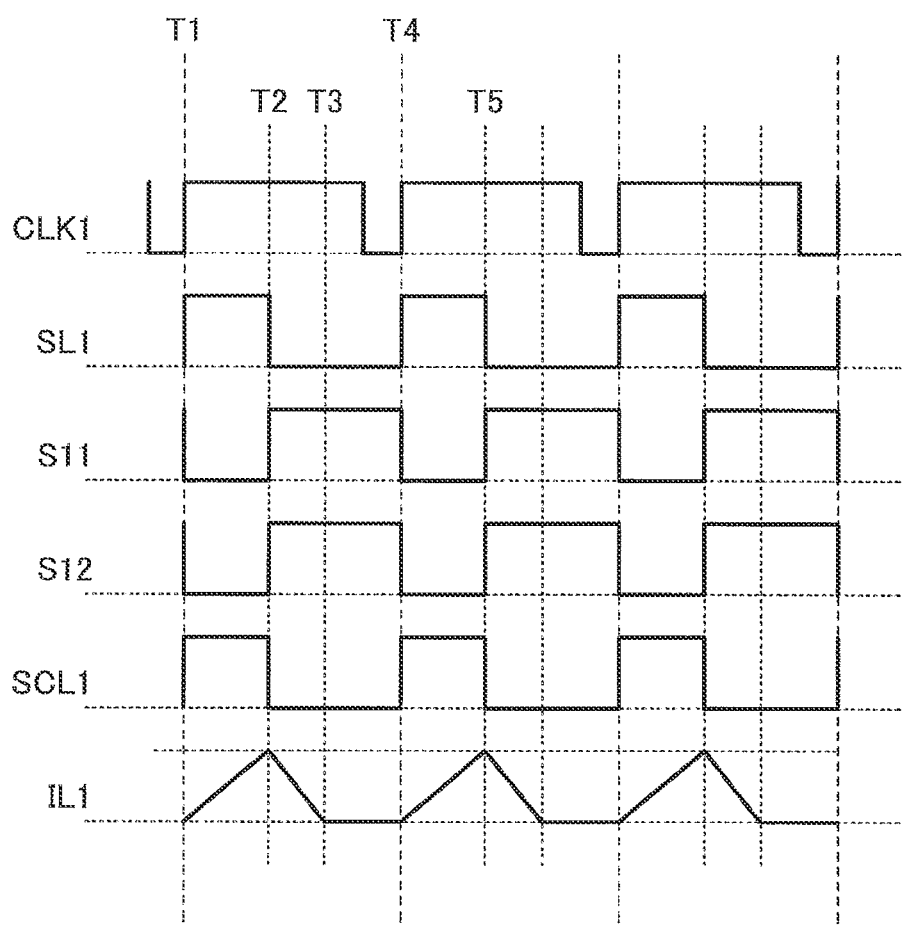
FIG. 5 is another timing diagram for illustrating an operation of a storage status adjusting circuit.

FIG. 5 is another timing diagram for illustrating an operation of a storage status adjusting circuit. In the present embodiment, as shown in FIG. 5, the control signal SG11 and the control signal SG12 for controlling the timing at which the switching elements S11 and S12 are switched on/off are inverted signals of control signal SGa for controlling the timing at which switching elements SL1 and SCL1 are switched on/off.

Further, in the present embodiment, energy back flow is prevented by the diode D1, when an electric potential at a connecting point of the secondary battery B1 and diode D1 is higher than an electric potential at a connecting point of the switching element S11 and diode D1. Therefore, in the present embodiment, the coil current IL1 never has a negative value.

Herein above, although the technology has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

The present application is based on Japanese Priority Application No. 2014-041559 filed on Mar. 4, 2014, the entire contents of which are hereby incorporated herein by reference.

What is claimed is:

1. A method of controlling a switch circuit which includes n (n is a natural number greater than or equal to 3) switching units configured to respectively connect n storage batteries, which are connected in series, with n coils, wherein the n storage batteries have respective potential differences between opposite ends thereof, the method comprising the step of:
controlling the switching units corresponding to k (k is a natural number wherein 1<k<n) storage batteries, which are secondary batteries other than a secondary battery having the largest potential difference among the potential differences of the n storage batteries, to connect the k storage batteries with respective k coils.

2. A method of controlling a switch circuit as claimed in claim 1, wherein the switch circuit further includes: n changeover units configured to respectively change over between energy accumulation and energy release in the n coils, and the method further comprises the step of:
releasing energy of the k coils, through the operations of k changeover units, when the k switching units are controlled to connect the k storage batteries with respective k coils.

3. A method of controlling a switch circuit as claimed in claim 2, wherein the switching units respectively include:
a first switching element configured to connect or disconnect a positive electrode of a storage battery with one end of a coil;
a second switching element configured to connect or disconnect a negative electrode of the storage battery with the other end of the coil;
wherein, the first switching element is controlled to switch off, based on the difference between an electric potential at the positive electrode of the storage battery and an electric potential at the one end of the coil, while the second switching element is controlled to switch off in synchronization with a timing at which a changeover unit is controlled to change over from energy release to energy accumulation.

4. A method of controlling a switch circuit as claimed in claim 3, wherein the changeover units are controlled to let the coils release energy to the secondary batteries when potential differences between both ends of the respective coils reach a certain value.

5. A storage status adjusting circuit, comprising:
n (n is a natural number greater than or equal to 3) switching units configured to respectively connect n storage batteries, which are connected in series, with n coils, wherein the n storage batteries have respective potential differences between opposite ends thereof;
wherein the switching units corresponding to k (k is a natural number wherein 1<k<n) storage batteries, which are secondary batteries other than a secondary battery having the largest potential difference among the potential differences of the n storage batteries, are controlled to connect the k storage batteries with respective k coils.

6. A storage battery pack, comprising:
n (n is a natural number greater than or equal to 3) coils; and
n storage batteries, having respective potential differences between opposite ends thereof, which are connected in series,
n switching units configured to respectively connect n storage batteries with n coils;
wherein the switching units corresponding to k (k is a natural number wherein 1<k<n) storage batteries, which are secondary batteries other than a secondary battery having the largest potential difference among the potential differences of the n storage batteries, are controlled to connect the k storage batteries with respective k coils.

* * * * *